United States Patent Office 2,958,672
Patented Nov. 1, 1960

2,958,672

CURING PROCESS FOR HIGH MOLECULAR WEIGHT POLYMERS INVOLVING THE USE OF FREE RADICAL GENERATORS AND FREE RADICAL ACCEPTORS AND PRODUCT THEREOF

Earl J. Goldberg, Wilmington, Del., assignor to E. I. du Pont de Nemours and Company, Wilmington, Del., a corporation of Delaware No Drawing. Filed Nov. 19, 1956, Ser. No. 622,814

14 Claims. (Cl. 260—45.5)

This invention relates to high moleclular weight, substantially saturated polymers prepared by the polymerization of monomers containing at least one carbon to carbon double bond, and more particularly to a curing process for these polymers involving the use of free radical generators such as organic peroxides and free radical acceptors such as bismaleimides.

The curing of polymers by means of free radical generators such as organic peroxides is known; however, this procedure is not entirely satisfactory since the peroxide tends to cause degradation of the polymers with undesirable side reactions, and in some instances, the properties of the cured polymers are not entirely satisfactory. For example, with the fluorocarbon polymers, the use of organic peroxides presents a serious problem in that blowing often occurs during the curing process.

It is an object of the present invention to provide a process for curing high molecular weight, substantially saturated polymers prepared by the polymerization of monomers containing at least one carbon to carbon double bond. A further object is to provide a process for curing high molecular weight, substantially saturated polymers prepared by the polymerization of monomers containing at least one carbon to carbon double bond, involving the use of free radical generators and free radical acceptors. A still further object is to provide a high molecular weight, substantially saturated polymer prepared by the polymerization of monomers containing at least one carbon to carbon double bond having incorporated therewith a free radical generator and a free radical acceptor. Other objects will appear hereinafter.

These and other objects of the following invention are accomplished by a process for curing high molecular weight, substantially saturated polymers prepared by the polymerization of monomers containing at least one carbon to carbon double bond which comprises incorporating with said polymers a free radical generator and a free radical acceptor and heating until the polymer is cured. This process enables many polymers to be cured which could not have been cured by the use of peroxides alone and, in the case of the polymers which were curable heretofore with peroxides, the process of the present invention is free of the undesirable features associated with peroxide type cures.

Representative free radical generators which may be incorporated with the polymers according to the present invention include organic peroxides and azobisaliphatic nitriles. The organic peroxides include compounds such as dicumyl peroxide, dibenzoyl peroxide, di-tert-butyl peroxide, cumene hydroperoxide, methyl ethyl ketone peroxide, tert, butyl perbenzoate and di-N-methyl-tert-butyl percarbamate. Representative azobisaliphatic nitriles include compounds such as 1,1'-azobisisobutyronitrile, 1,1'-azobis(a-γ-dimethylvaleronitrile) and 1,1'-azobiscyclohexane carbonitrile.

The free radical acceptors which are used in conjunction with the free radical generators in the process of the present invention are compounds which will react with the free radicals generated in the polymers. Representative acceptors include compounds such as N-substituted maleimides, N,N'-substituted bismaleimides, and cyclic triacryloylhexahydrotriazine. The maleimides are compounds having the formula:

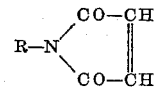

wherein R is an alkyl or an aryl radical. Representative maleimides include compounds such as N-methyl maleimide, N-phenyl maleimide and N-pyrenyl maleimide. The bismaleimides may be represented by the formula:

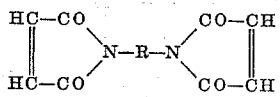

wherein R is an alkylene or an arylene radical. Representative bismaleimides include N,N'-ethylene bismaleimide, N,N'-phenylene bismaleimide and N,N'-pyrenylene bismaleimide. In addition to the bismaleimides, triacryloylhexahydrotriazine may be used.

The quantity of free radical generator used will depend on the degree of cure desired and the reactivity of the polymer being cured. In general, at least 0.1% by weight is required and preferably 0.5–3.0% is used. However, polymers such as the fluoroelastomers may require as much as 6% or even 10%. Greater quantities may be used but the economics of such addition is unfavorable. The quantity of free radical acceptor ranges from about 0.5% to 6% by weight of the polymer. Here again, the state of cure desired has a governing effect. The weight of the free radical acceptor may be less, equal to, or more than the weight of the free radical generator with about 10% being a reasonable upper limit.

A wide variety of high molecular weight, substantially saturated polymers prepared by the polymerization of monomers containing at least one carbon to carbon double bond may be cured according to the process of the present invention. They include the polymers wherein the polymeric chain is essentially made up of carbon atoms and which are substantially free of intralinear ethylenic C=C unsaturation in the polymeric chain. In general, the polymers which are cured by this invention have molecular weights of at least 5000 and for the most part these polymers are solids; however, it is to be understood that high molecular weight liquid polymers may also be used. Representative polymers include polyethylenes; ethylene-propylene copolymers; sulfochlorinated polyethylenes; fluorocarbon polymers, e.g., copolymers of vinylidine fluoride and hexafluoropropene and copolymers of vinylidine fluoride and chlorotrifluoroethylene. Polymeric resins are also within the materials which may be cured according to the process of the present invention, including vinylchloride-vinylacetate copolymers, polyvinyl acetate, polyvinyl chloride, polybutyl/isobutyl methacrylate, polystyrene, polyvinyl acetals and polyvinyl formal.

Polyethlene polymers are commercially available and are prepared in a general way according to U.S. Patents 2,153,553 and 2,145,350. Homopolymers and copolymers of olefines prepared at lower temperatures and pressures are described in Belgian Patents 533,362; 538,782; 530,617; and 535,082. Sulfochlorinated polyethylenes are prepared by the process described in U.S. Patent 2,416,061. The copolymers of vinylidine fluoride and hexafluoropropene are described in U.S. Serial No. 504,351 in the name of Rexford, now abandoned. The copolymers of vinylidine fluoride and chlorotrifluoroethylene are available under the name of Kel-F elastomers and are described in Rubber Age, vol. 75 (January 1955), pages 543–550.

In carrying out the process of the present invention, it is necessary merely to mix, by standard milling procedures, the free radical generator and the free radical acceptor with the polymeric material which is to be cured, and to heat until a cure is obtained. The temperature range may vary within wide limits depending upon the particular generator, acceptor, and polymer being used. However, heating to temperatures of about 50–200° C. for from 30 minutes to several hours is ordinarily adequate. Longer times and/or higher temperatures may be used in the case of the more chemically inert polymers or with the more thermally stable free radical generators.

The following examples will better illustrate the nature of the present invention; however, the invention is not intended to be limited to these examples. Parts are by weight unless otherwise indicated.

EXAMPLE 1

A. An ethylene-propylene copolymer is prepared by continuously feeding the following reactants into a steel reaction vessel under vigorous agitation while maintaining the temperature of the reaction mass at 40° C.:

2.0 volumes/minute of 0.1 M benzene solution of aluminum triisobutyl
0.66 volumes/minute of 0.1 M benzene solution of $TiCl_4$
5.0 volumes/minute of benzene and an ethylene-propylene gas stream containing 50–55 mol percent ethylene at such a rate that no gas escapes from the vessel.

The black, viscous liquid product is withdrawn from the bottom of the reaction vessel. The average residence time is 1 hour 50 minutes. The copolymer is isolated by adding to isopropanol, boiling, and washing repeatedly in boiling isopropanol. The copolymer is then dried on a rubber mill at 100° C.

B. 100 parts of the copolymer prepared above is compounded on a rubber mill with 30 parts of easy processing channel black, 1.5 parts of dicumyl peroxide and 4.5 parts of m-phenylene bismaleimide. The black is mixed in at 100–110° C. Then the mill is cooled and the peroxide and bismaleimide are milled in at 30–40° C.

A control is made omitting the m-phenylene bismaleimide.

The stocks are cured in a press at 10,000 lbs. platen pressure at 150° C. for 1 hour. The samples are then conditioned at room temperature at 50% relative humidity for 18 hours. The modulus at 300% elongation, measured on an Instron tester at 25° C., is 860 lbs. per square inch for the sample containing the m-phenylene bismaleimide and less than 120 lbs. per square inch for the control. It is evident that a high degree of cure is obtained with the m-phenylene bismaleimide.

EXAMPLE 2

100 parts of a sulfochlorinated polyethylene, prepared from a polyethylene having a melt index of about 10, made according to U.S. Patent 2,416,061 and containing 1.5% sulfur and 27.5% chlorine, is milled on a rubber roll mill with 45 parts of high abrasion furnace black at 100–110° C. for 10 minutes. The mill is then cooled and 1 part of 1,1'-azobiscyclohexanecarbonitrile and 3 parts of m-phenylene bismaleimide are milled in at 35–40° C. The mass is then sheeted off the mill.

A control is made the same way without the m-phenylene bismaleimide.

After conditioning at room temperature at 50% relative humidity for 18 hours, both samples are tested for modulus by the Williams ring method in water at 25° C. The modulus at 100% elongation is 1000 lbs. per square inch for the sample, compared to 590 lbs. per square inch for the control. This test shows the very significant improvement in cure effected by the combination curing system.

EXAMPLE 3

100 parts of the sulfochlorinated polyethylene of Example 2 is mixed with 45 parts of high abrasion furnace black on a rubber roll mill at 100–110° C. The mill is cooled to 35–40° C. and 0.5 part of dicumyl peroxide and 3.0 parts of triacryloylhexahydrotriazine are milled in. The compounded stock is sheeted off the mill and put in molds and cured in a press at 150° C. for 1 hour. The samples are conditioned by storing for 18 hours at room temperature at 50% relative humidity.

A control is made the same way except that the triacryloylhexahydrotriazine is omitted.

The modulus at 200% elongation at 25° C. in water is 790 lbs. per square inch for the sample, compared to 450 lbs. per square inch for the control, indicating the much higher state of cure achieved under the same processing conditions when using the triacryloylhexahydrotriazine.

EXAMPLE 4

100 parts of polyethylene prepared according to U.S. Patent 2,151,553 and having a softening point of 96° C., a hardness of 48 (D scale), and a stiffness of 32,000 lbs. per square inch, is banded on a rubber roll mill at 100–110° C. and then cooled to about 40° C. 4 parts of m-phenylene bismaleimide and 2 parts of dicumyl peroxide are milled in. The stock is sheeted from the mill. It is cured for 2 hours at 120° C. on a 4-cavity, 1" x 5" slab mold at 10,000 to 15,000 lbs. platen pressure.

The cured polymer did not deform appreciably under a 1–2 lbs. per square inch load at 130° C., whereas uncured polyethylene or controls with m-phenylene bismaleimide or dicumyl peroxide alone melt and flow.

EXAMPLE 5

(A) 20 grams of polyvinyl alcohol resin is dissolved in 200 g. of water and 16 g. of isopropyl alcohol by vigorous agitation over a period of 2 hours. 20 grams of glycerine is then added and the solution is heated to 75° C.

(1) 85 grams of solution is removed and a small portion poured on a glass plate coated with a mold release agent. It is then allowed to dry 4 days so as to form a film and is then heated for 4 hours at 100–110° C.

(2) 0.4 gram dicumyl peroxide, which is equivalent to 3 parts/100 parts resin, is added to the remaining solution and dissolved with agitation. 85 grams of this solution is removed and treated as in (A)(1) above.

(3) 0.4 gram of m-phenylene bismaleimide is added to the solution remaining from (A)(2) above, containing the dicumyl peroxide, and dissolved with agitation. A film is formed as in (A)(1) above.

(B) 5 gram weights are suspended from 2" x .25" x .008" pieces of the films which are placed in graduates containing 50 ml. of water at 90° C. The film of (A)(1) breaks, partially dissolves and degenerates to a gelatinous mass. Film (A)(2) containing only the dicumyl peroxide breaks and dissolves, while film (A)(3) containing both the dicumyl peroxide and bismaleimide swells somewhat but retains its shape and does not break under the weight.

The following examples will illustrate the curing process of the present invention on fluorocarbon polymers. It is well known that a serious blow problem exists in the curing of these fluorocarbon polymers. Successful control of this blowing problem can be obtained by utilizing the process of the present invention wherein a free radical acceptor is used in conjunction with the free radical generator.

EXAMPLE 6

(A) A stainless steel pressure vessel is swept with nitrogen and charged with 125 parts of deoxygenated distilled water containing 0.16 part of ammonium persulfate, 0.03 part of sodium bisulfite and 0.33 part of disodium phosphate heptahydrate. The closed vessel is cooled to −80° C. and purged of oxygen by three alternate cycles of producing a vacuum in the vessel and then pressuring with oxygen-free nitrogen. The nitrogen is then removed, and, while the system is under reduced pressure, 35 parts each of gaseous hexafluoropropene and vinylidene fluoride is bled into the pressure vessel. The system is agitated and the temperature inside the reaction chamber raised to 100° C. over a 15-minute period. The autogenous pressure is observed to increase to about 700 p.s.i.g. which drops to 300 p.s.i.g. after two hours. After an additional heating period of 12 hours to insure that the reaction is completed, the reaction mass is allowed to cool to room temperature and the pressure chamber vented to the atmosphere. The partially coagulated latex product is removed and coagulation completed by the addition of a small amount of dilute hydrochloric acid. The coagulated crumb is washed thoroughly with water and rolled on a hot rubber mill at about 140° C. to obtain 63 parts (90% conversion) of an off-white elastomer in rolled sheet form. Analysis of this elastomer for carbon, hydrogen and fluorine by combustion analysis indicates that the product copolymer contains about 45% hexafluoropropene and about 55% vinylidene fluoride by weight.

(B) The following formulations are prepared:

|  | (1) | (2) |
|---|---|---|
| Polymer of 6(A) | 100.0 | 100.0 |
| Zinc oxide | 5.0 | 5.0 |
| Silica | 17.5 | 17.5 |
| Silicone oil | 2.5 | 2.5 |
| Free radical generator | 2.0 | 2.0 |
| Triacryloylhexahydrotriazine | 0 | 4.0 |

The compounded stocks are molded into ½″ x ¾″ pellets at a temperature of 149° C. for 45 minutes. This is followed by heating at 204° C. for 16 hours in an oven.

(C) The following free radical generators are used with formulations (B)(1) and (B)(2) above:

Dicumyl peroxide
Benzoyl peroxide
Di-tert-butyl peroxide
Methyl ethyl ketone peroxide
Cumene hydroperoxide
Tert-butyl perbenzoate
Di-N-methyl-tert-butyl percarbamate
1,1′-azobiscyclohexane carbonitrile When these free radical generators are used in formulation (B)(1) above (no free radical acceptor present), the compounded stocks all exhibit some degree of blowing. When these free radical generators are used in formulation (B)(2) above, the stocks do not exhibit any blow whatsoever.

EXAMPLE 7

(A) The following formulations are prepared:

|  | (1) | (2) |
|---|---|---|
| Polymer of 6(A) | 100.0 | 100.0 |
| Zinc oxide | 5.0 | 5.0 |
| Silica | 17.5 | 17.5 |
| Silicone oil | 2.5 | 2.5 |
| Benzoyl peroxide | 2.0 | 2.0 |
| Free radical acceptor | 0 | 4.0 |

The compounded stocks are molded into ½″ x ¾″ pellets at 149° C. for 45 minutes followed by oven after curing at 204° C. for 16 hours.

(B) Formulation (A)(1) above is blown very badly; however, when any of the following free radical acceptors are used with formulation (A)(2) above, no blowing occurs:

m-Phenylene bismaleimide
N-p-tolyl maleimide
N,N′-ethylene bismaleimide
Triacryloylhexahydrotriazine

EXAMPLE 8

The following formulations are prepared:

|  | (a) | (b) |
|---|---|---|
| Polymer of 6(A) | 100.0 | 100.0 |
| Zinc oxide | 5.0 | 5.0 |
| Silica | 17.5 | 17.5 |
| Silicone oil | 2.5 | 2.5 |
| Methyl ethyl ketone peroxide | 10.0 | 10.0 |
| Triacryloylhexahydrotriazine | 0 | 5.0 |

The compounded stocks are press-molded at 149° C. for 45 minutes in pellets ½″ x ¾″ size. Formulation (a) is blown while formulation (b) shows no signs of blow whatsoever.

EXAMPLE 9

The following formulations are prepared:

|  | (a) | (b) |
|---|---|---|
| Polymer of 6(A) | 100.0 | 100.0 |
| Zinc oxide | 5.0 | 5.0 |
| Silica | 17.5 | 17.5 |
| Silicone oil | 2.5 | 2.5 |
| Di-tert-butyl-peroxide | 6.0 | 6.0 |
| N,N′-ethylene bismaleimide | 0 | 4.0 |

The compounded stocks are molded at 149° C. into ¾″ x ½″ pellets and after cured 12 hours at 177° C.

Formulation (a) is badly blown while formulation (b) shows no blow whatsoever.

EXAMPLE 10

(A) A vinylidene fluoride-chlorotrifluoroethylene copolymer containing 30% by weight of vinylidene fluoride and 70% by weight of chlorotrifluoroethylene is prepared as follows:

To a stainless steel polymerization vessel is added a solution of 1.04 parts of ammonium persulfate, 0.2 part of sodium bisulfite, 2.1 parts of disodium hydrogen phosphate heptahydrate and 0.5 part of ammonium perfluorooctanoate in 160 parts of deoxygenated water. Then a mixture of 132 parts of chlorotrifluoroethylene and 30 parts of vinylidene fluoride is introduced into the vessel. The mixture is heated with agitation to 60° C., the pressure falling from 900 p.s.i. to 550 p.s.i. in 45 minutes, at which point the reaction is complete. The latex produced in this manner is coagulated with sodium chloride and the coagulant washed and dried to yield 58 parts of polymer. Elemental analysis shows the composition of the polymer to be approximately 70% by weight chlorotrifluoroethylene and 30% by weight vinylidene fluoride.

(B) The following formulations are prepared:

|  | (1) | (2) |
|---|---|---|
| Polymer of (a) above | 100.0 | 100.0 |
| Zinc oxide | 5.0 | 5.0 |
| Silica | 17.5 | 17.5 |
| Silicone oil | 2.5 | 2.5 |
| Benzoyl peroxide | 4.0 | 4.0 |
| N,N′-ethylene bismaleimide | 0 | 4.0 |

The compounded stocks are molded in ½″ x ¾″ pellets at 110° C. for 45 minutes followed by oven after curing at 149° C. for 12 hours.

Formulation (B)(1) is blown while formulation (B)(2) shows no signs of blow whatsoever.

EXAMPLE 11

The following formulations are prepared:

|  | (a) | (b) |
|---|---|---|
| Polymer of 10(A) | 100.0 | 100.0 |
| Zinc oxide | 5.0 | 5.0 |
| Silica | 17.5 | 17.5 |
| Silicone oil | 2.5 | 2.5 |
| Benzoyl peroxide | 6.0 | 6.0 |
| N-p-tolyl maleimide | 0 | 4.0 |

The compounded stocks at molded at 149° C. into ¾″ x ½″ pellets and after cured 12 hours at 177° C.

Formulation (a) is badly blown while formulation (b) shows no signs of blow whatsoever.

EXAMPLE 12

(A) The following commercially available polymeric resins are used in this example:

(1) Vinylchloride/vinyl acetate copolymer, known as Tygon.
(2) Polyvinyl acetate known as Vinylite Ayat.
(3) Polyvinyl chloride, known as Geon Resin 101.
(4) Polybutyl/isobutyl methacrylate, known as Lucite 46.
(5) Polystyrene, grade KTPL-3, obtained from Koppers Company.

(B) Each of the above polymeric resins is broken down on a 2″ x 6″ rubber mill at 150° C. and is compounded as indicated in Table I, following, with suitable special ingredients and plasticizers. The roll temperature is then reduced and from 1 to 2 parts of dicumyl peroxide (DiCup) and 4 parts of m-phenylene bismaleimide (m-PBM) are added as free radical generators and free radical acceptors, respectively, and the stock is compounded by standard techniques. In each instance, two control samples are taken, the first of which does not have either the DiCup or the m-PBM, and the second sample having only the DiCup added.

The compounded polymeric resins are cured by heating in 1″ x 5″ slab molds in a standard hydraulic press for 15 minutes at temperatures of about 150° C. at 3000–5000 lbs. per square inch platen pressure.

The compounded polymeric resins are tested for temperature deformation by puncturing strips of the resin at the top and bottom and suspending them from a horizontal bar in an oven for 15 minutes at the temperatures shown in Table II. Stress is added, where necessary, by suspending weights from the bottom of the samples with qualitative differences in sample stretching being noted.

Table I

COMPOUNDING AND CURING OF RESINS WITH DiCUP/m=PBM

| Resin | Curing Ingredients | | Other Ingredients | Compounding Temp., °C | Curing Conditions, 15 min., °C |
|---|---|---|---|---|---|
|  | m-PBM | DiCup |  |  |  |
| (A) (1) | 4 | 1 | None | 115 | 150 |
| (A) (2) | 4 | 1 | do | 75–80 | 150 |
| (A) (3) | 4 | 1.1 | 55 parts dioctyl phthalate and 2 parts dibutyl tin maleate. | 150 | 160 |
| (A) (4) | 4 | 1 | None | 95–100 | 150 |
| (A) (5) | 4 | 2 | 42 parts dibutyl phthalate. | 15 | 150 |

Table II

TEMPERATURE DEFORMATION TESTS ON CURED RESINS

| Resin | Conditions | | Remarks |
|---|---|---|---|
|  | Load p.s.i. | 15 min in oven at °C. |  |
| (A) (1) | 1.1 | 180 | Stretched 100%. |
| (A) (2) | 1.8 | 120 | Stretched 25%. |
| (A) (3) | 1.1 | 170 | Stretched 19%. |
| (A) (4) | 1.8 | 130 | Stretched but did not break. |
| (A) (5) | 0 | 80 | Stretched 25%. |

In each instance, the control samples stretch appreciably more than is noted with the resins tested above and in some instances the control samples melt and break.

It is readily apparent that the process of the present invention permits the curing of a wide variety of high molecular weight, substantially saturated polymers prepared by the polymerization of monomers containing at least one carbon to carbon double bond. It permits the curing of polymers which could not have been cured by the use of an organic peroxide or an azobisaliphatic dinitrile as a free radical generator alone and, in the case of the polymers which are curable by means of peroxide, it permits the use of a much lower concentration of peroxide with attendant reduction of undesirable side reactions and results in cured polymers having better properties over those polymers which are cured by means of the free radical generator alone.

The polymers which are cured by the process of the present invention may be formed into sheets or films or fibers after incorporation of the free radical acceptor and the free radical generator before heating to cure. These shaped forms may be prepared by extruding the compounded stock through suitable dies. They may also be prepared by dissolving the compounded stock in a volatile solvent and laying down a layer of the solution and allowing the solvent to evaporate or extruding a concentrated solution through a spinneret and the solvent evaporated. The resulting films or fibers are then subjected to heat to cure. The compounded stock may be formed into thin sheets on roller mills and the sheets taken off as unsupported films. If desired, the films may be calendered onto substrates and the composite heated to cure the polymer. Particularly useful films are made from olefine homopolymers or copolymers.

The polymers which are cured according to the present invention may be used generally as polymers which have been cured by the known conventional curing procedures; however, the curing processes of the present invention yield polymers which tend to be more solvent resistant and higher melting. The cured polyethylene polymers may be used for injection molding, electrical insulation, supported and unsupported films and fibers, wrapping materials, etc., and the fluoropolymers may be used in the manufacture of films, fibers, tapes, and coating for wires and ceramics.

The polymers may be varied by the incorporation of compounding ingredients at the time that the free radical generator and acceptor are incorporated in the polymer. Suitable compounding ingredients are carbon black, pigments, etc.

As many widely different embodiments of this invention may be made without departing from the spirit and scope thereof, it is to be understood that this invention is not limited to the specific embodiments thereof except as defined in the appended claims.

What is claimed is:

1. A composition comprising a polymer having a molecular weight of at least 5000 and prepared by the polymerization of monomers containing at least one carbon-to-carbon double bond, said polymer having a polymeric chain made up of carbon atoms essentially joined by carbon-to-carbon single bonds; from 0.1 to 10 percent by weight of a compound selected from the group consisting of organic peroxides and azobisaliphatic nitriles; and from 0.5 to 6 percent by weight of a compound selected from the group consisting of N-substituted maleimides, N,N'-substituted bismaleimides and triacryloylhexahydrotriazine.

2. A process for curing a polymer having a molecular weight of at least 5000 and prepared by the polymerization of monomers containing at least one carbon-to-carbon double bond, said polymer having a polymeric chain made up of carbon atoms essentially joined by carbon-to-carbon single bonds, which comprises mixing with said polymer (a) a compound selected from the group consisting of organic peroxides and azobisaliphatic nitriles and (b) a compound selected from the group consisting of N-substituted maleimides, N,N'-substituted bismaleimides and triacryloylhexahydrotriazine, and heating said polymer until a cure is obtained.

3. A process for curing a polymer having a molecular weight of at least 5000 and prepared by the polymerization of monomers containing at least one carbon-to-carbon double bond, said polymer having a polymeric chain made up of carbon atoms essentially joined by carbon-to-carbon single bonds, which comprises mixing with said polymer (a) from 0.1 to 10 percent by weight of a compound selected from the group consisting of organic peroxides and azobisaliphatic nitriles and (b) from 0.5 to 6 percent by weight of a compound selected from the group consisting of N-substituted maleimides, N,N'-substituted bismaleimides and triacryloylhexahydrotriazine, and heating said polymer until a cure is obtained.

4. The process of claim 3 wherein the polymer having a molecular weight of at least 5000 is polyethylene.

5. The process of claim 3 wherein the polymer having a molecular weight of at least 5000 is an ethylene/propylene copolymer.

6. The process of claim 3 wherein the polymer having a molecular weight of at least 5000 is a fluorocarbon copolymer selected from the group consisting of a vinylidene fluoride-hexafluoropropene copolymer and a vinylidene fluoride-chlorotrifluoroethylene copolymer.

7. The process of claim 6 wherein the fluorocarbon copolymer is a copolymer of vinylidene fluoride and hexafluoropropene.

8. A process for curing a fluorocarbon copolymer having a molecular weight of at least 5000, said copolymer being selected from the group consisting of a vinylidene fluoride-hexafluoropropene copolymer and a vinylidene fluoride-chlorotrifluoroethylene copolymer which comprises mixing with said copolymer from 0.1 to 10 percent by weight of dicumyl peroxide and from 0.5 to 6 percent by weight of m-phenylene bismaleimide, and heating said copolymer until a cure is obtained.

9. The process of claim 8 wherein the fluorocarbon copolymer is a copolymer of vinylidene fluoride and hexafluoropropene.

10. A process for curing a polyethylene polymer having a molecular weight of at least 5000 which comprises mixing with said polymer from 0.1 to 3 percent by weight of dicumyl peroxide and from 0.5 to 6 percent by weight of m-phenylene bismaleimide, and heating said polymer to a temperature of about 50 to 200° C. until a cure is obtained.

11. A process for curing a fluorocarbon copolymer having a molecular weight of at least 5000, said copolymer being selected from the group consisting of a vinylidene fluoride-hexafluoropropene copolymer and a vinylidene fluoride-chlorotrifluoroethylene copolymer which comprises mixing with said copolymer from 0.1 to 10 percent by weight of benzoyl peroxide and from 0.5 to 6 percent by weight of triacryloylhexahydrotriazine, and heating said copolymer until a cure is obtained.

12. The composition of claim 1 in the form of a film.

13. The product obtained by the process of claim 3.

14. The product obtained by the process of claim 3 in the form of a film.

References Cited in the file of this patent

UNITED STATES PATENTS

| | | |
|---|---|---|
| 2,669,555 | Giammaria | Feb. 16, 1954 |
| 2,686,773 | D'Alelio | Aug. 17, 1954 |
| 2,708,663 | Downing et al. | May 17, 1955 |